July 18, 1933.  E. A. BESTE  1,918,515
DRAIN FITTING
Filed March 31, 1932
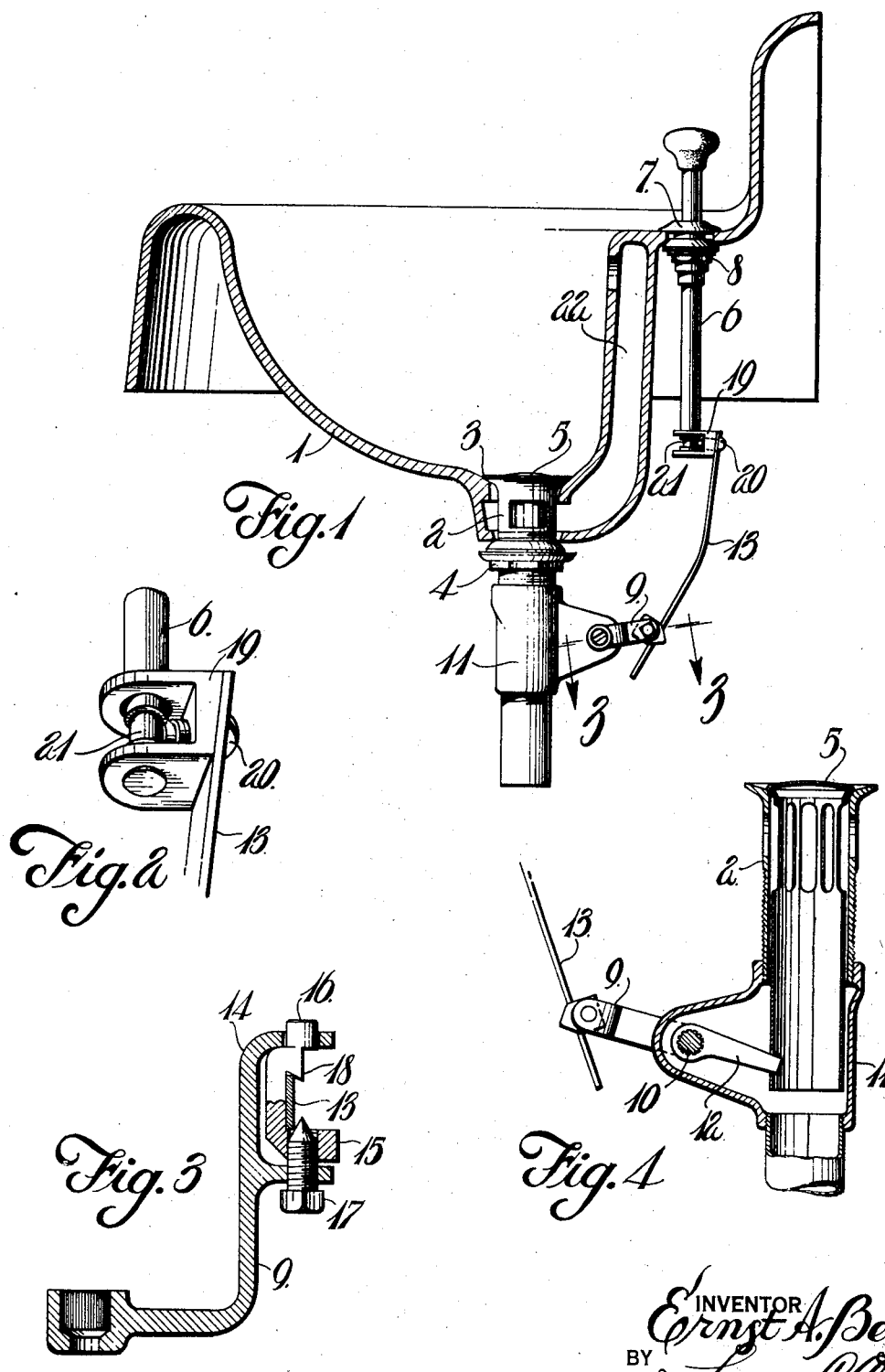
INVENTOR
Ernst A. Beste
BY
Lyman C. Conger
ATTORNEY Patented July 18, 1933

1,918,515

UNITED STATES PATENT OFFICE

ERNST A. BESTE, OF KOHLER, WISCONSIN

DRAIN FITTING

Application filed March 31, 1932. Serial No. 602,225.

My invention relates to improvements in drain fittings of the type wherein the drain closing mechanism is operated by means of a lift rod extending through and back of the fixture upon which the drain fitting is installed.

Such fittings have achieved a high degree of popularity, as they possess numerous advantages over other types of drain fittings.

However, since friction between the parts is relied upon to maintain the drain fitting in its lifted or draining position, when the parts become somewhat worn and the friction between them is lessened, the drain is apt to close by itself, preventing complete draining of the fixture.

It is an object of my invention to obviate this difficulty by providing means to create sufficient friction to assure that the valve will remain open until closed by the operator.

Further objects will be apparent from the following description.

Figure 1 is a sectional view of a lavatory, showing my improved drain fitting mounted thereon; Fig. 2 is a detail view of a portion of the lift rod and spring showing the method of connecting the same; Fig. 3 is a sectional view of the crank arm along the lines 3—3 of Fig. 1; Fig. 4 is a sectional view of the drain fitting showing the operating mechanism of the valve.

In the drawing the numeral 1 indicates a lavatory apertured to receive a drain fitting 2 which is held in place in any suitable manner as by a flange 3 abutting the upper surface of the lavatory and a nut 4 abutting the lower surface of the lavatory. The lavatory 1 is provided with the usual overflow passageway 22. The drain fitting 2 contains a tubular valve 5 adapted to prevent the escape of water from the lavatory when in its lower or closed position and to allow the draining of the lavatory when raised from its seat as hereinafter described. The valve 5 is operated by means of a lift rod 6 which extends through and behind the lavatory and is attached thereto by a flanged guide 7 and a nut 8. The lift rod 6 is connected to a crank arm or actuating member 9 which is splined or otherwise connected to the shaft 10 which is journaled in opposite sides of the sleeve 11 which has threaded connection to the drain fitting 2. The shaft 10 has an extended lug or finger 12 which extends through an aperture in the valve 5.

When the lift rod 6 is pushed downward it causes a downward movement of the crank arm 9 rotating the shaft 10 and causing the finger 12 to travel upward, raising and unseating the valve 5 and allowing the water to drain from the lavatory. When the lift rod 6 is raised the reverse action takes place and the valve 5 is seated, retaining the water in the lavatory.

The fitting thus far described is a conventional one, it being understood that in the conventional type the lift rod 6 extends to and has direct connection with the crank arm 9, and is what is known in the art as a "pop-up" waste valve, this term being applied to waste valves which are lifted by depressing the lift rod.

Although I have shown my invention in connection with a pop-up drain fitting, it will be apparent that it is equally applicable to other types of drain fittings such as, for example, the so-called lift drains, in which the valve is raised by raising the lift rod and seated by depressing the lift rod, in which case the crank arm 9 is dispensed with and a direct and non-flexible connection made between the valve and the lift rod.

The term "lift rod" herein comprehends any rod used for operating a drain valve, whether the valve moves in the same direction as the lift rod or in the reverse direction.

My invention consists in an improvement in the lift rod and in the means for connecting it. Instead of having the lift rod, ordinarily in cylindrical form and of solid metal, extend directly to the crank arm 9, I interpose a flat spring 13 between the lift rod and the crank arm. This spring is disposed so that it is necessary to bend it somewhat in order to attach it to the crank arm 9. Thus it exerts a constant outward pull or tension upon the crank arm 9 and causes the shaft 10 to be forced firmly against its journals, creating sufficient friction to prevent the valve 5 from closing of its own weight. It will be understood that the spring 13 is of such resiliency as to create enough friction to accomplish this result, yet not enough to cause the valve to bind or stick and be difficult to operate.

The crank arm 9 terminates in a bifurcated yoke 14 as shown in Fig. 3. A clamp 15 has a trunnion 16 extending through an aperture in the yoke 14. A set screw 17 having a conical point extends through an aperture in the opposite bifurcation of the yoke 14 and is threaded in and extends through the clamp 15. The set screw 17 acts not only as a clamping means for the spring 13, but as a trunnion so that the clamp 15 is pivotally mounted in the yoke 14.

An angular shoulder 18 extends from the opposite side of the clamp 15. The spring 13 is placed in the clamp 15 and the set screw 17 tightened, whereby the spring 13 is firmly clamped between the set screw and the shoulder 18. This furnishes not only an adjustment which will compensate for variations in the length of the spring 13, but also allows an adjustment whereby the tension obtainable from the spring may be regulated by removing the spring, rotating the clamp 15 through the arc of one-half of a circle, and again inserting the spring, thus lessening the bend in the spring and the consequent tension created thereby.

Further adjustment is obtained by the method of attaching the spring 13 to the lift rod 6. A bifurcated collar 19 is fitted over the end of the lift rod. The spring 13 is attached to the collar 19 by means of a set screw 20 which extends through the collar and enters an annular groove 21 in the extremity of the lift rod 6. The collar 19 is thus secured to the lift rod 6, yet may be rotated thereon and the tension of the spring 13 may be varied by detaching it, rotating the collar through the arc of one-half of a circle, and again attaching the spring 13.

All of the operating mechanism is located outside of the overflow 22, thus preventing fouling by waste water and making a more sanitary installation.

It will be apparent to those skilled in the art that modifications in the form shown may be made without departing from the spirit of my invention; therefore, I do not limit myself to the exact form shown, but claim all constructions within the spirit of my invention and the scope of the appended claims.

I claim:

1. In combination, a drain fitting, a valve positioned therein, a shaft revolubly mounted in said drain fitting, a finger extending from said shaft and engaging said valve, a crank arm mounted on said shaft, a lift rod and a spring interposed between said lift rod and said crank arm.

2. In a drain fitting, the combination of a valve, means for operating said valve, a spring adapted to create a tension upon said valve operating means whereby to create friction to sustain said valve in the raised position, and means for adjusting the tension obtainable by said spring upon said valve operating means.

3. In a lavatory waste, the combination of a drain fitting comprising a valve seat, a valve positioned in said drain fitting and movable in a longitudinal direction along the axis of said drain fitting to open and close said valve, means for opening and closing said valve, a lift rod and a spring interposed between said lift rod and said valve operating means and forming a connection therebetween.

4. In a lavatory waste, the combination of a drain fitting comprising a valve seat, a valve positioned in said drain fitting and movable in a longitudinal direction along the axis of said drain fitting to open and close said valve, means for opening and closing said valve, a vertically movable lift rod and a spring interposed between said lift rod and said valve operating means and forming a connection therebetween.

5. In a lavatory waste, the combination of a drain fitting comprising a valve seat, a tubular valve positioned in said drain fitting and movable in a longitudinal direction along the axis of said drain fitting to open and close said valve, means for opening and closing said valve, a lift rod and a spring interposed between said lift rod and said valve operating means and forming a connection therebetween.

6. In combination, a drain fitting, a valve positioned therein, a shaft revolubly mounted in said drain fitting, a finger extending from said shaft and engaging said valve, a crank arm mounted on said shaft, a lift rod, a spring attached to said lift rod, and a pivotal connection between said spring and said crank arm.

7. A lavatory waste for a lavatory having an integral overflow at the rear thereof, comprising in combination a drain fitting, a valve positioned therein, valve actuating means, a lift rod and a spring interposed between said lift rod and said valve actuating means, said lift rod and said spring being positioned outside of and behind said overflow.

8. In a waste for a lavatory, the combination of a drain fitting, a valve, valve actuating means comprising an actuating member positioned outside of said drain fitting, a lift rod extending through and behind said lavatory, and a spring positioned behind said lavatory and interposed between said lift rod and said valve actuating member.

9. In a lavatory waste, the combination of a valve, valve actuating means, a lift rod and a spring interposed between said lift rod and said valve actuating means, said lift rod extending through said lavatory and being in the main positioned outside thereof, and said valve actuating means and said spring being positioned ouside of said lavatory.

ERNST A. BESTE.